United States Patent
Yu et al.

(10) Patent No.: US 7,609,772 B2
(45) Date of Patent: Oct. 27, 2009

(54) APPARATUS AND METHOD FOR OPTIMALLY COMPENSATING FOR IMBALANCE BETWEEN IN-PHASE AND QUADRATURE-PHASE IN A ZERO-IF OFDM RECEIVER

(75) Inventors: Hyun-Seok Yu, Seoul (KR); Hyun-Seok Oh, Seoul (KR); Ji-Won Ha, Seoul (KR); Min-Goo Kim, Yongjn-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 670 days.

(21) Appl. No.: 11/148,179

(22) Filed: Jun. 9, 2005

(65) Prior Publication Data

US 2006/0182189 A1 Aug. 17, 2006

(30) Foreign Application Priority Data

Feb. 17, 2005 (KR) ...................... 10-2005-0013131

(51) Int. Cl.
*H04L 27/28* (2006.01)
(52) U.S. Cl. ...................... 375/260; 375/316; 375/229; 375/285; 375/259; 455/59
(58) Field of Classification Search .................. 375/260, 375/316, 346, 344, 345, 347, 348
See application file for complete search history.

(56) References Cited

U.S. PATENT DOCUMENTS 6,987,815 B2 * 1/2006 Denno .................. 375/316
7,167,513 B2 * 1/2007 Tsui et al. .................. 375/229
7,376,170 B2 * 5/2008 Scheck .................. 375/130
7,433,298 B1 * 10/2008 Narasimhan, Ravi ....... 370/208
2003/0035470 A1 * 2/2003 Gu .................. 375/219
2003/0072393 A1 * 4/2003 Gu .................. 375/322
2003/0231726 A1 * 12/2003 Schuchert et al. .......... 375/350
2005/0118963 A1 * 6/2005 Chiu .................. 455/115.1
2005/0152463 A1 * 7/2005 DeChamps et al. ......... 375/260
2006/0056554 A1 * 3/2006 Lin et al. .................. 375/350
2006/0078058 A1 * 4/2006 Lin .................. 375/260
2007/0058755 A1 * 3/2007 Husted .................. 375/332

* cited by examiner

*Primary Examiner*—Shuwang Liu
*Assistant Examiner*—Kenneth Lam
(74) *Attorney, Agent, or Firm*—Roylance, Abrams, Berdo & Goodman, LLP

(57) ABSTRACT

An optimum I/Q imbalance compensating apparatus and method in a zero-IF OFDM receiver. In the apparatus, a first compensator generates a first symbol by removing interference from a second distorted symbol on an $(N_s-m+1)^{th}$ subcarrier from a first distorted symbol on an $m^{th}$ subcarrier by a first compensation coefficient in an OFDM FFT signal of $N_s$ subcarriers. A first hard decider generates a first compensated symbol by hard-decision on the first symbol, an error calculator generates an error symbol by subtracting the first received symbol from the first compensated symbol. A second compensator generates a second symbol by eliminating interference from the first distorted symbol from the second distorted symbol using a second compensation coefficient. A second hard decider generates a second compensated symbol by hard-decision on the second symbol, and an adaptive controller updates the first compensation coefficient using the error symbol and the second compensation symbol.

6 Claims, 4 Drawing Sheets

ABSTRACT

APPARATUS AND METHOD FOR OPTIMALLY COMPENSATING FOR IMBALANCE BETWEEN IN-PHASE AND QUADRATURE-PHASE IN A ZERO-IF OFDM RECEIVER

PRIORITY

This application claims the benefit of 35 U.S.C. §119(a) of an application entitled "Apparatus And Method For Optimally Compensating For Imbalance Between In-Phase And Quadrature-Phase In A Zero-IF OFDM Receiver" filed in the Korean Intellectual Property Office on Feb. 17, 2005 and assigned Serial No. 2005-13131, the entire contents of which are hereby incorporated by reference.

BACKGROUND OF THE INVENTION

1. Field of the Invention

The present invention relates generally to an Orthogonal Frequency Division Multiplexing (OFDM) system. In particular, the present invention relates to an apparatus and method for optimally compensating for imbalance between in-phase (I) and quadrature-phase (Q) in a zero-Intermediate Frequency (IF) OFDM receiver that downconverts a radio frequency (RF) signal directly to a baseband signal.

2. Description of the Related Art

OFDM is a prominent high-speed data transmission scheme for future-generation communications. Due to simultaneous transmission of mutually orthogonal subcarriers, OFDM has excellent frequency band efficiency. Also, the use of Cyclic Prefix (CP) effectively cancels Inter-Symbol Interference (ISI) caused by multipath fading, which is one of the most challenging problems in a radio communication environment.

Meanwhile, systems such as Digital Multimedia Broadcasting (DMB) or Digital Video Broadcasting-Handhelds (DVB-H) attempt a zero-IF approach to overcoming cost and system complexity constraints because IF Surface Acoustic Wave (SAW) filters make chip integration difficult. The use of the zero-IF technique is concentrated in the fields of mobile terminals or Wireless Local Area Networks (WLAN), which are presently highly competitive technologies.

While a combination of zero-IF reception architecture and OFDM enables the manufacture of receivers having excellent performance and a simple RF structure, I/Q imbalance inherent to a zero-IF receiver may cause performance degradation.

There are many traditional techniques for compensating for the I/Q imbalance in single-carrier systems. The most basic one is to design an analog circuit that creates variable gain and phase. Another is to generate a known signal in a receiving side, pass the known signal through an analog receiver, and estimate the distortion of the output, to thereby compensate for the I/Q imbalance.

Aside from those analog methods, there are I/Q imbalance correcting methods based on digital signal processing. A major one of them is to transmit a predetermined pilot signal from a transmitter and estimate the I/Q imbalance using the pilot signal at a receiver. A Minimum Mean Square Error (MMSE) I/Q imbalance compensation method, which is an expansion of the above method, uses an adaptive filter in correcting the I/Q imbalance instead of direct estimation of the I/Q imbalance using the pilot. This method advantageously achieves good performance, is able to track a change in the I/Q imbalance, and is implemented simply.

However, I/Q imbalance compensation using an additional I/Q imbalance estimation circuit at an analog receiver is likely to decrease the performance of a zero-IF receiver used with the aim to design an RF part as simple as possible for implementation of a reliable communication system. Moreover, I/Q imbalance compensation based on digital signal processing requires a pilot signal of a long period for accurate estimation, thereby increasing overhead. In view of the nature of analog devices, the I/Q imbalance value can be changed over time due to a variety of factors including temperature. Thus, for accurate I/Q imbalance estimation, the pilot signal needs to be transmitted periodically, which decreases transmission efficiency and imposes constraints on systems.

These problems can be solved by an MMSE I/Q imbalance compensation using a Least Mean Square (LMS) adaptive filter. This MMSE I/Q imbalance compensation technique requires an accurate reference signal for imbalance interference to obtain the tap coefficient of an adaptive filter. Since, in fact, only a signal including noise and affected by the I/Q imbalance can be generated at the receiver, it is impossible to optimally compensate for the I/Q imbalance using an MMSE compensator. This shortcoming does not matter to a low-level modulation such as Binary Phase Shift Keying (BPSK) or Quadrature Phase Shift Keying (QPSK), but serious performance degradation arises from the use of an inaccurate MMSE compensator in the case of multi-level Quadrature Amplitude Modulation (QAM).

OFDM is considered for extensive use as a future-generation communication scheme in various fields, and adopts schemes for adaptively using multi-level QAM to increase band efficiency. In the situation where the zero-IF receiver attracts more and more interest due to its benefits in terms of chip integration, the I/Q imbalance problem of a zero-IF OFDM receiver significantly decreases the performance of QAM modulation/demodulation. Although the I/Q imbalance can be compensated for by use of an MMSE compensator, optimum performance is impossible with the tap coefficient of the MMSE compensator derived from an inaccurate reference signal.

SUMMARY OF THE INVENTION

An object of the present invention is to substantially solve at least the above problems and/or disadvantages and to provide at least the advantages below. Accordingly, an object of the present invention is to provide an apparatus and method for only initially compensating for I/Q imbalance using a known signal by an LMS algorithm and then eliminating I/Q imbalance-caused interference using a noise-free accurate reference signal.

The above and other objects are achieved by providing an apparatus and method for optimally compensating I/Q phase imbalance in a zero-IF OFDM.

According to one aspect of the present invention, in the optimum I/Q imbalance compensating apparatus, a first compensator generates a first received symbol by eliminating an interference component caused by a second distorted symbol on an $(N_s-m+1)^{th}$ subcarrier from a first distorted symbol on an $m^{th}$ subcarrier using a predetermined first compensation coefficient in a received OFDM signal comprising $N_s$ subcarriers after fast-Fourier-transform of the OFDM signal. A first hard decider generates a first compensated symbol by performing a hard decision on the first received symbol. An error calculator generates an error symbol by subtracting the first compensated symbol from the first received symbol. A second compensator generates a second received symbol by eliminating an interference component caused by the first distorted symbol from the second distorted symbol using a predetermined second compensation coefficient. A second hard decider generates a second compensated symbol by performing a hard decision on the second received symbol. An adaptive controller updates the first compensation coefficient for the first compensator based on the error symbol and the second compensation symbol.

According to another aspect of the present invention, in the optimum I/Q imbalance compensating method, a first received symbol is generated by eliminating an interference component caused by a second distorted symbol on an $(N_s-m+1)^{th}$ subcarrier from a first distorted symbol on an $m^{th}$ subcarrier using a predetermined first compensation coefficient in a received OFDM signal including $N_s$ subcarriers after a fast-Fourier-transform of the OFDM signal. A first compensated symbol is generated by performing a hard decision on the first received symbol. An error symbol is generated by subtracting the first compensated symbol from the first received symbol. A second received symbol is generated by eliminating an interference component caused by the first distorted symbol from the second distorted symbol using a predetermined second compensation coefficient. A second compensated symbol is generated by performing a hard decision on the second received symbol. The first compensation coefficient for the first compensator is updated based on the error symbol and the second compensation symbol.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE EXEMPLARY EMBODIMENTS

Exemplary embodiments of the present invention will be described herein below with reference to the accompanying drawings. In the following description, well-known functions or constructions are not described in detail for the sake of conciseness.

The present invention characteristically utilizes the fact that a symbol on one subcarrier serves as I/Q imbalance-caused interference on a symbol on another subcarrier in an OFDM modulation/demodulation configuration.

Figure 1:
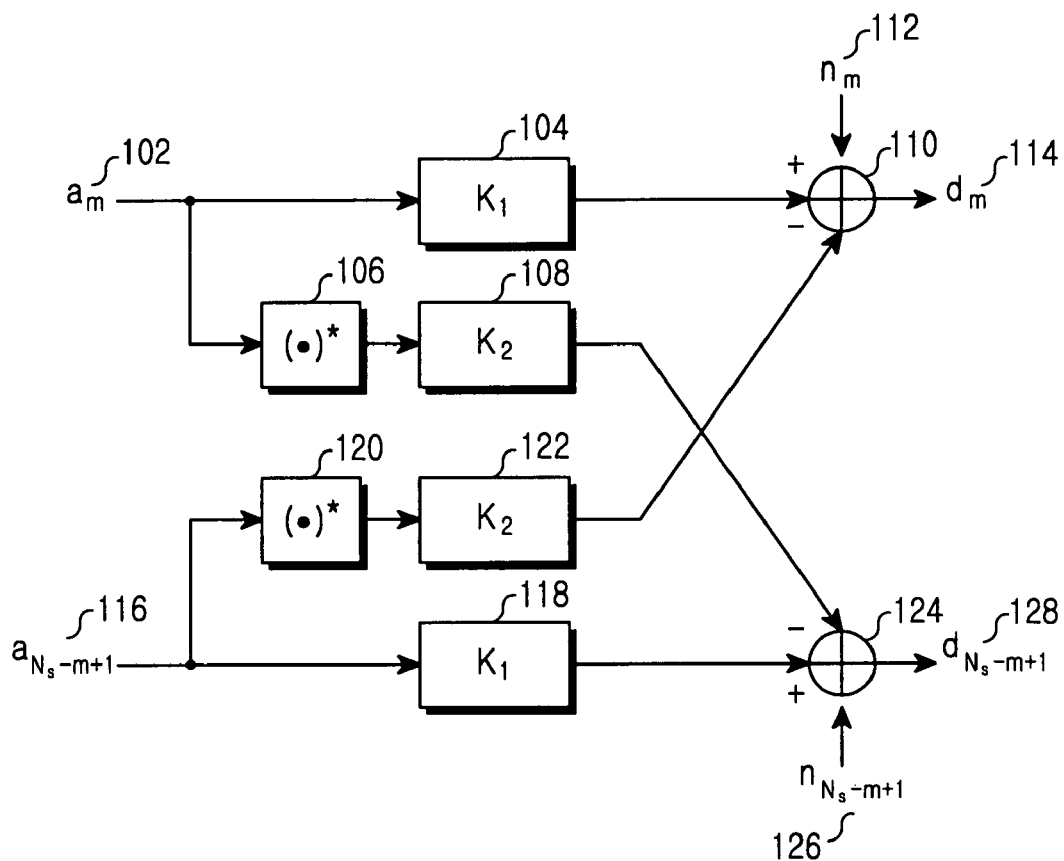
FIG. 1 illustrates I/Q imbalance in a zero-IF OFDM receiver according to an embodiment of the present invention.

FIG. 1 illustrates I/Q imbalance in a zero-IF OFDM receiver according to an embodiment of the present invention. In the illustrated case, among $N_s$ subcarriers in total, interference occurs between a QAM symbol 102, $a_m$ on an $m^{th}$ subcarrier and a QAM symbol 116, $a_{Ns-m+1}$ on an $(N_s-m+1)^{th}$ subcarrier due to I/Q imbalance therebetween in an analog circuit of the receiver. It is to be appreciated herein that the illustrated devices are shown for the purpose of conceptually illustrating distortion and noise, rather than real hardware devices.

Let I-QM imbalance-caused errors in phase and amplitude be denoted by $\theta$ and G, respectively. In Equation (1), $K_1$ and $K_2$ representing distortion characteristics of the analog circuit are expressed as $$K_1 = (1 + Ge^{-j2\pi\theta})/2$$
$$K_2 = (1 - Ge^{-j2\pi\theta})/2$$
K
Equation (1)

QAM symbol 102 $a_m$ passes through a $K_1$ block 104 representing the distortion characteristic of the analog circuit and is added to the Additive White Gaussian Noise (AWGN) component $n_m$ of the $m^{th}$ subcarrier in an adder 110. At the same time, QAM symbol 102 $a_m$ passes through a conjugate calculator 106 and a $K_2$ block 108 representing the distortion characteristic of the analog circuit and is applied as interference for QAM symbol 116 $a_{Ns-m+1}$ to an adder 124. QAM symbol 116 $a_{Ns-m+1}$ passes through a $K_1$ block 118 and is added to the AWGN component $n_{(Ns-m+1)}$ of the $(N_s-m+1)^{th}$ subcarrier in the adder 124. At the same time, QAM symbol 116 $a_{Ns-m+1}$ passes through a conjugate calculator 120 and a $K_2$ block 122 and is applied as interference for $a_m$ to the adder 112.

Finally, I/Q imbalance-caused distorted symbols 114 and 128 output from the adders 112 and 124, respectively, are $$d_m = K_1 a_m + K_2 a^*_{Ns-m+1} + n_m$$
$$d_{Ns-m+1} = K_1 a_{Ns-m+1} + K_2 a^*_m + n_{Ns-m+1}$$
Equation (2)

where $n_m$ and $n_{Ns-m+1}$ are AWGN components.

Based on the above-described principle, embodiments of the present invention compensates for the I/Q imbalance.

Figure 2:
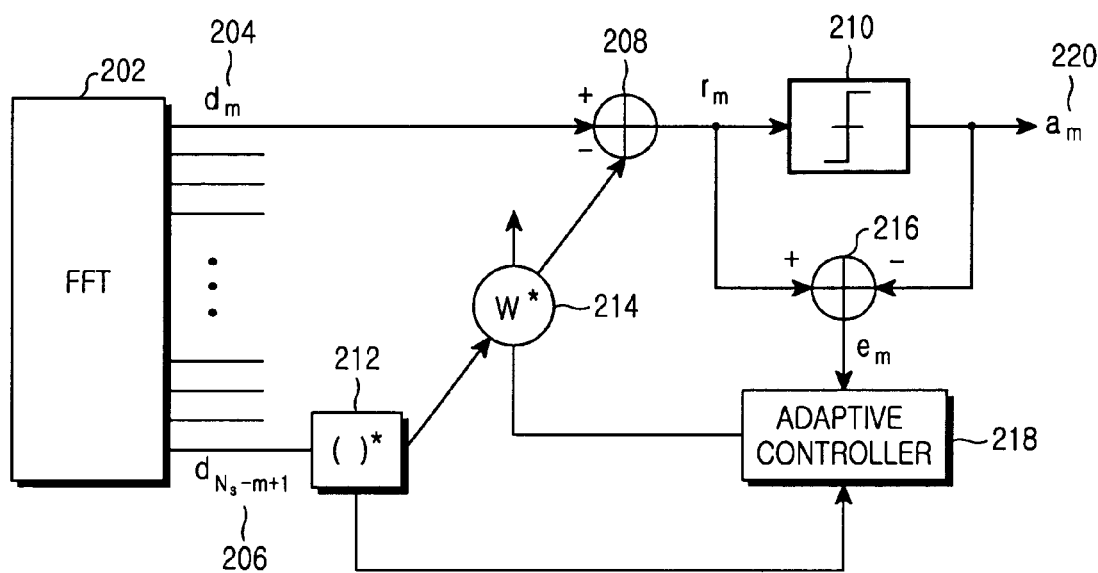
FIG. 2 is a block diagram of an I/Q imbalance compensator in a zero-IF receiver according to an embodiment of the present invention.

FIG. 2 is a block diagram of an I/Q imbalance compensator in a zero-IF receiver according to an embodiment of the present invention. The I/Q imbalance compensator cancels interference on an $m^{th}$ subcarrier using the symbol of an $(N_s-m+1)^{th}$ subcarrier.

Referring to FIG. 2, a Fast Fourier Transformer (FFT) 202 FFT-processes a time-domain signal received from an antenna through an analog circuit and outputs a plurality of symbols corresponding to a plurality of subcarriers. These symbols involve I/Q imbalance as they pass through the analog circuit.

A distorted symbol 204, $d_m$ on the $m^{th}$ subcarrier from among the symbols output from the FFT 202 is provided to a subtractor 208, and a distorted symbol 206, $d_{Ns-m+1}$ on the $(N_s-m+1)^{th}$ subcarrier passes through a conjugate calculator 212 and provided to an adaptive compensator 214. The adaptive compensator 214 estimates an I/Q imbalance-caused interference signal from the received symbol using a coefficient w and cancels the interference.

The subtractor 208 outputs a symbol $r_m$ sent on the $m^{th}$ subcarrier by subtracting the output of the adaptive compensator 214 from $d_m$. A hard decider 210 performs a hard decision on $r_m$ and outputs the hard-decision value as a compensated symbol 220, $a_m$ for the $m^{th}$ subcarrier.

Meanwhile, an error calculator 216 generates an error symbol $e_m$ by subtracting $a_m$ from $r_m$. An adaptive controller 218 adaptively updates the coefficient w for every symbol for the adaptive compensator 214 according to an LMS algorithm by comparing $e_m$ with $d_{Ns-m+1}$.

In FIG. 2, $r_m$ is a signal on the $m^{th}$ subcarrier after I/Q compensation. The reception error is defined as $e_m = a_m - r_m$. Thus, the Mean Square Error (MSE) of the receiver is determined as $J = E|e_m|^2$. An MMSE solution minimizing the MSE becomes the coefficient w for the adaptive compensator 214. If γ is Signal-to-Noise Power Ratio (SNR), the coefficient for the adaptive compensator 214 is calculated by $$w_{MMSE} = \frac{K_2^*(2K_1^* - 1)}{|K_1|^2 + |K_2|^2 + 1/\gamma} \quad \text{Equation (3)}$$

In practice, however, the coefficient calculated by Equation (3) is not an optimum coefficient that maximizes the Signal-to-Interference and Noise Power Ratio (SINR). Let the expectation of X be denoted by E|X|. Then the SINR is determined by $$SINR = \frac{E|(K_1 - w^* K_2^*)a_m|^2}{E|(K_2 - w^* K_1^*)a_{N_s-m+1}^* + n_m - w^* n_{N_s-m+1}^*|^2} \quad \text{Equation (4)}$$

The coefficient of Equation (3) does not maximize the SINR of Equation (4) because a reference signal used to cancel interference in the LMS algorithm is inaccurate due to the effects of noise and I/Q imbalance.

Figure 3:
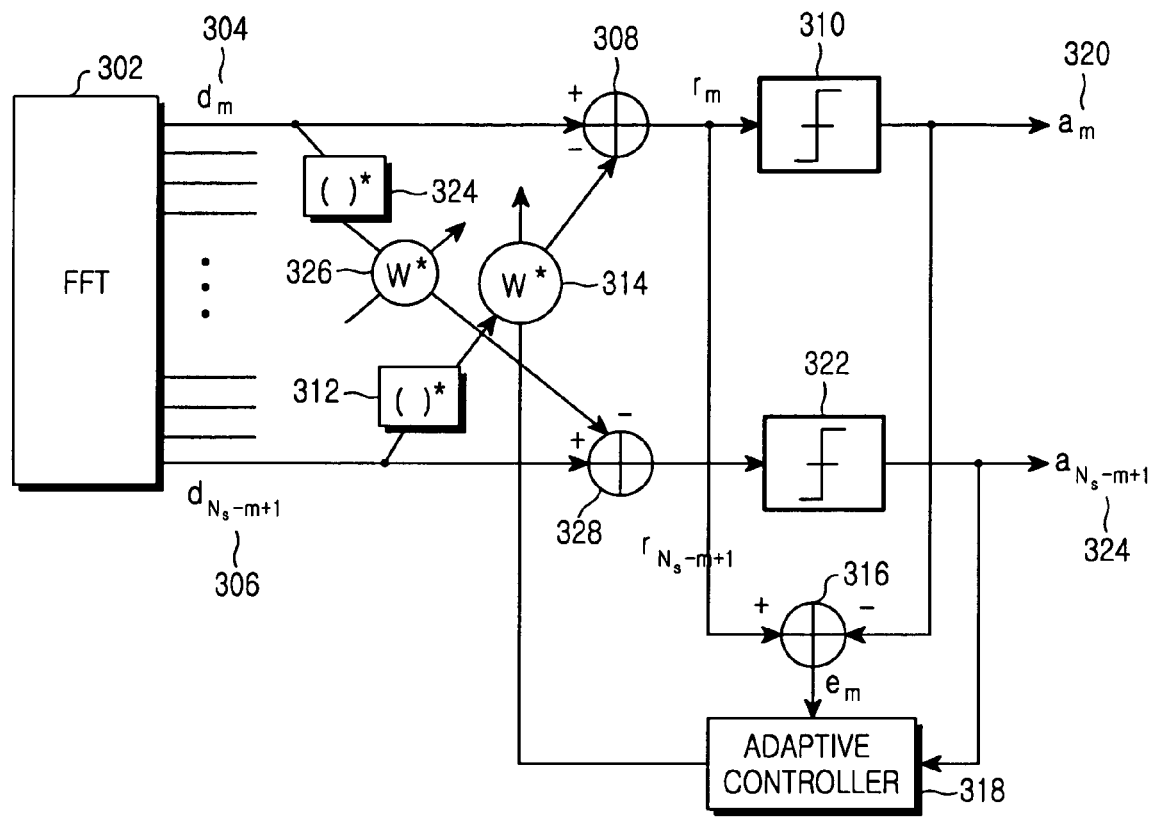
FIG. 3 is a block diagram of an optimum I/Q imbalance compensator according to an embodiment of the present invention.

Because the I/Q imbalance compensator configured as described above eliminates interference on $d_m$ using the symbol already affected by the I/Q imbalance, $d_{Ns-m+1}$, optimum I/Q imbalance compensation is impossible. Therefore, after the I/Q imbalance is only initially compensated for by the LMS algorithm using a known signal, I/Q imbalance-caused interference is canceled in a decision-directed manner using a hard-decided symbol as a reference signal for adaptive control in an embodiment of the present invention FIG. 3 is a block diagram of an optimum I/Q imbalance compensator according to an embodiment of the present invention. Referring to FIG. 3, the optimum I/Q imbalance compensator is comprised of an FFT 302, subtractors 308 and 328, hard-deciders 310 and 322, a conjugate calculator 312, an adaptive compensator 314, an error calculator 316, and an adaptive controller 318.

In operation, a distorted symbol 304, $d_m$ received on an $m^{th}$ subcarrier among symbols output from the FFT 302 is provided to the subtractor 308, and a distorted symbol 306, $d_{Ns-m+1}$ received on an $(N_s-m+1)^{th}$ subcarrier is provided to the adaptive compensator 314 through the conjugate calculator 312. The adaptive compensator 314 estimates an I/Q imbalance-caused interference signal from the received symbol using a coefficient w and cancels the interference.

The subtractor 308 outputs a symbol $r_m$ sent on the $m^{th}$ subcarrier by subtracting the output of the adaptive compensator 314 from $d_m$. A hard decider 310 performs a hard decision on $r_m$ and outputs the hard-decision value as a compensated symbol 320, $a_m$ for the $m^{th}$ subcarrier.

At the same time, the distorted symbol 306 $d_{Ns-m+1}$ is also converted to a received symbol $r_{Ns-m+1}$ through a compensation path. The hard decider 322 performs a hard decision on $r_{Ns-m+1}$ and outputs the hard-decision value as a compensated symbol 324, $a_{Ns-m+1}$ for the $(N_s-m+1)^{th}$ subcarrier.

Meanwhile, the error calculator 316 generates an error symbol $e_m$ by subtracting $a_m$ from $r_m$. The adaptive controller 318 adaptively updates the coefficient w for every symbol for the adaptive compensator 314 according to an LMS algorithm by comparing $e_m$ with $d_{Ns-m+1}$ and $a_{Ns-m+1}$.

In FIG. 3, the FFT 302 FFT-processes a time-domain signal received from an antenna through analog circuit and outputs a plurality of symbols corresponding to a plurality of subcarriers. These symbols involve I/Q imbalance as they pass through the analog circuit.

The distorted symbol 304, $d_m$ on the $m^{th}$ subcarrier among the symbols output from the FFT 302 is provided to the subtractor 308, and the distorted symbol 306, $d_{Ns-m+1}$ on the $(N_s-m+1)^{th}$ subcarrier is provided to the adaptive compensator 314 through the conjugate calculator 312. The adaptive compensator 314 estimates an I/Q imbalance-caused interference signal from the received symbol using the coefficient w and cancels the interference.

The subtractor 308 outputs the symbol $r_m$ sent on the $m^{th}$ subcarrier by subtracting the output of the adaptive compensator 314 from $d_m$. A hard decider 310 performs a hard decision on $r_m$ and outputs the hard-decision value as the compensated symbol 320, $a_m$ for the $m^{th}$ subcarrier.

At the same time, the distorted symbol $d_{Ns-m+1}$ is also converted to the received symbol $r_{Ns-m+1}$ in the same compensation procedure. The hard decider 322 performs a hard decision on $r_{Ns-m+1}$ and outputs the hard-decision value as the compensated symbol 324, $a_{Ns-m+1}$ for the $(N_s-m+1)^{th}$ subcarrier. Specifically, $d_m$ is applied to the adaptive compensator 326 through the conjugate calculator 324. The subtractor 328 subtracts the output of the adaptive compensator from $d_{Ns-m+1}$ and outputs the received symbol $r_{Ns-m+1}$ to the hard decider 322.

Meanwhile, the error calculator 316 generates the error symbol $e_m$ by subtracting $a_m$ from $r_m$. The adaptive controller 318 adaptively updates the coefficient w for every symbol for the adaptive compensator 314 according to an LMS algorithm using $e_m$, $d_{Ns-m+1}$ and $a_{Ns-m+1}$.

The optimum I/Q imbalance compensator illustrated in FIG. 3 eliminates the interference signal $K_2 a^*_{Ns-m+1}$ from $d_m$ shown in Equation (2) using both the hard-decided symbols $a_m$ and $a_{Ns-m+1}$ as a reference signal for adaptive compensation. The amplitude distortion component $K_1$ of the distorted QAM symbol $K_1 a_m$ is compensated for by a one-tap equalizer (not shown) and thus is not considered herein.

When communication starts, the adaptive controller 318 calculates the compensation coefficient w using a received signal in the LMS algorithm. The LMS algorithm has the advantages of simple and small computation and excellent convergence performance. Yet, initial LMS convergence is slow in an I/Q imbalance compensator using a blind LMS algorithm. To overcome this drawback, the transmitter transmits a known signal to the receiver in an early operation stage. Once a coarse compensation coefficient is determined for the I/Q imbalance compensator after transitioning from an initial transition state to a steady state, the I/Q imbalance compensator converges the compensation coefficient by activating the LMS algorithm in a blind mode using a data symbol instead of the known signal. At this time, an embodiment of the decision-directed method is applied, and accurate convergence is achieved while noise is significantly reduced relative to the conventional method. The adaptive controller 318 preferably updates the compensation coefficient by $$w[n+1] = w[n] + \mu a^*_{Ns-m+1}[n] e^*_m[n] \quad \text{Equation (5)}$$

where w[n+1] is the updated compensation coefficient, w[n] is the compensation coefficient before updating, μ is a step size, $a_{Ns-m+1}$ is the second compensated symbol, μ is a predetermined step size, n is a symbol index and $e_m$ is the error symbol. The symbol * is the conjugation operation.

The most prominent advantage of the zero-IF transmitter/receiver is that the IF frequency is not used. This in turn obviates the need for a SAW filter. The SAW filter is the cause of the increased modem chip size because it is hard to integrate on a chip. Embodiments of the present invention efficiently eliminate I/Q imbalance generated in the RF part of the zero-IF receiver utilizing the characteristics of an OFDM receiver. Therefore, embodiments of the present invention are helpful in designing a simple modem chip. Also, embodiments of the present invention do not have performance degradation even in a high-order QAM modulation. Therefore, considering that even a slight I/Q imbalance results in a significant performance decrease along with widespread use of OFDM-QAM, embodiments of the present invention enables implementation of a highly band-efficient communication system. Even though analog devices such as relative inexpensive mixers, ADCs and DACs are used, the I/Q imbalance compensator can eliminate distortion involved in the analog devices, and an inexpensive transmitter/receiver can be realized. The embodiments of the present invention are applicable to terrestrial DMB systems and OFDM systems, and provides great performance improvement especially for DVB-H using a high-order QAM.

Figure 4:
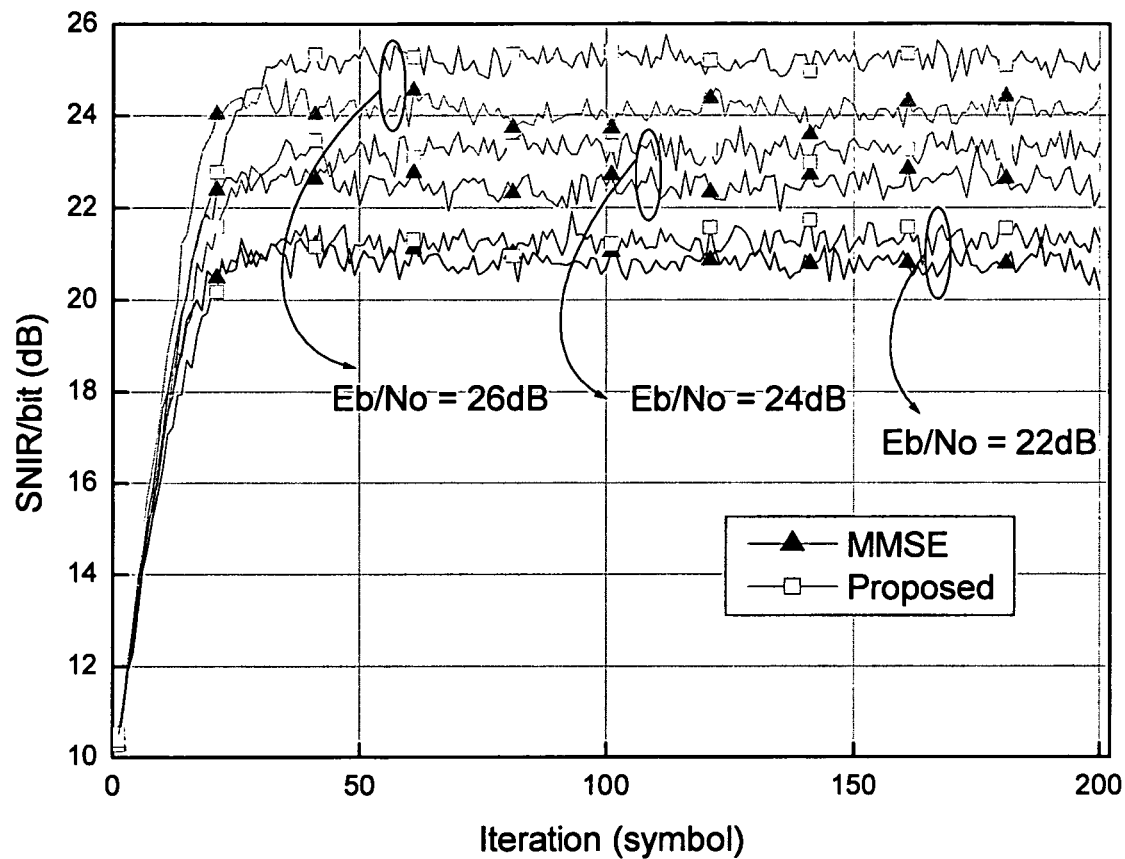
FIG. 4 is a graph illustrating performance improvement in 256-QAM of a typical AWGN channel with I-Q offsets of 1 dB and 10 degrees according to an embodiment of the present invention.

FIG. 4 is a graph illustrating performance improvement in 256-QAM of a typical AWGN channel with I-Q offsets of 1 dB and 10 degrees according to an embodiment of the present invention. For noise to bit energy (Eb/No) of 26 dB, 24 dB, and 22 dB, changes in SNR per bit are illustrated with respect to symbol iteration.

Referring to FIG. 4, it is noted that at a later initial coefficient convergence time, embodiments of the present invention (shown as Proposed) has higher SNR per bit than a conventional MMSE method.

In accordance with embodiments of the present invention as described above, the performance degradation caused by I/Q imbalance can be minimized even in a high-order QAM, thereby maximizing OFDM transmission efficiency.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for optimally compensating in-phase/quadrature-phase imbalance in a zero-intermediate frequency (IF) orthogonal frequency division multiplexing (OFDM) receiver, comprising:
    a first compensator for generating a first received symbol by eliminating an interference component caused by a second distorted symbol on an $(N_s-m+1)^{th}$ subcarrier from a first distorted symbol on an $m^{th}$ subcarrier using a predetermined first compensation coefficient in a received OFDM signal including $N_s$ subcarriers after a fast-Fourier-transform of the OFDM signal;
    a first hard decider for generating a first compensated symbol by performing a hard decision on the first received symbol;
    an error calculator for generating an error symbol by subtracting the first compensated symbol from the first received symbol;
    a second compensator for generating a second received symbol by eliminating an interference component caused by the first distorted symbol from the second distorted symbol using a predetermined second compensation coefficient;
    a second hard decider for generating a second compensated symbol by performing a hard decision on the second received symbol; and
    an adaptive controller for updating the first compensation coefficient for the first compensator based on the error symbol and the second compensation symbol.

2. The apparatus of claim 1, wherein the first compensation coefficient is updated by $$w[n+1]=w[n]+\mu a^*_{N_s-m+1}[n]e^*_m[n]$$

where w[n+1] is an updated compensation coefficient, w[n] is the compensation coefficient before updating, $\mu$ is a step size, $a_{N_s-m+1}$ is the second compensated symbol, * is the conjugation operation and $e_m$ is the error symbol.

3. The apparatus of claim 1, wherein the first compensator comprises:
    a conjugate calculator for calculating a conjugate symbol of the second distorted symbol;
    an adaptive compensator for compensating for the conjugate symbol by the compensation coefficient; and
    a subtractor for subtracting the output of the adaptive compensator from the first distorted symbol and outputting the result as the first received symbol.

4. A method of optimally compensating in-phase/quadrature-phase imbalance in a zero-intermediate frequency (IF) orthogonal frequency division multiplexing (OFDM) receiver, comprising the steps of:
    generating a first received symbol by eliminating an interference component caused by a second distorted symbol on an $(N_s-m+1)^{th}$ subcarrier from a first distorted symbol on an $m^{th}$ subcarrier using a predetermined first compensation coefficient in a received OFDM signal including $N_s$ subcarriers after fast-Fourier-transform of the OFDM signal;
    generating a first compensated symbol by performing a hard decision on the first received symbol;
    generating an error symbol by subtracting the first compensated symbol from the first received symbol;
    generating a second received symbol by eliminating an interference component caused by the first distorted symbol from the second distorted symbol using a predetermined second compensation coefficient;
    generating a second compensated symbol by performing a hard decision on the second received symbol; and
    updating the first compensation coefficient for the first compensator based on the error symbol and the second compensation symbol.

5. The method of claim 4, wherein the first compensation coefficient is updated by $$w[n+1]=w[n]+\mu a^*_{N_s-m+1}[n]e^*_m[n]$$

where w[n+1] is an updated compensation coefficient, w[n] is the compensation coefficient before updating, $\mu$ is a step size, $a_{N_s-m+1}$ is the second compensated symbol, * is the conjugation operation and $e_m$ is the error symbol.

6. The method of claim 4, wherein the first received symbol generating step comprises the steps of:
    calculating a conjugate symbol of the second distorted symbol;
    adaptively compensating for the conjugate symbol by the compensation coefficient; and
    subtracting the output of the adaptive compensator from the adaptively compensated symbol and outputting the result as the first received symbol.

* * * * *

UNITED STATES PATENT AND TRADEMARK OFFICE
CERTIFICATE OF CORRECTION

PATENT NO. : 7,609,772 B2
APPLICATION NO. : 11/148179
DATED : October 27, 2009
INVENTOR(S) : Yu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Twelfth Day of October, 2010

David J. Kappos
*Director of the United States Patent and Trademark Office*